Figure 1:
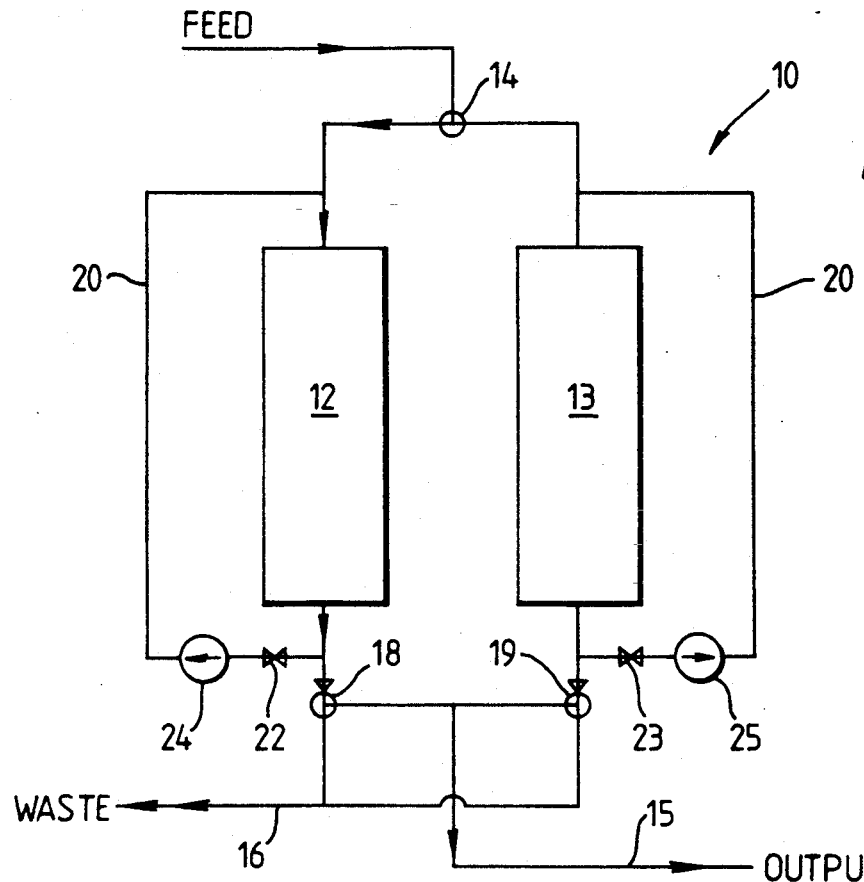

United States Patent [19]
Turner et al.

[11] Patent Number: 5,240,572
[45] Date of Patent: Aug. 31, 1993

[54] ELECTROCHEMICAL ION EXCHANGE

[75] Inventors: Andrew D. Turner, Abingdon; Nevill J. Bridger, Hermitage, both of United Kingdom

[73] Assignee: United Kingdom Atomic Energy Authority, London, United Kingdom

[21] Appl. No.: 698,911

[22] Filed: May 13, 1991

[30] Foreign Application Priority Data

May 26, 1990 [GB] United Kingdom ............... 9012186

[51] Int. Cl.[5] ............................................. C02F 1/46
[52] U.S. Cl. .................................. 204/149; 204/231; 204/269; 204/275; 204/291
[58] Field of Search ............... 204/149, 269, 275, 291, 204/231

[56] References Cited

U.S. PATENT DOCUMENTS

| 3,074,863 | 1/1963 | Jasionowski | 204/151 |
| 3,074,865 | 1/1963 | Gaysowski | 204/151 |
| 3,533,929 | 10/1970 | Evans | 204/149 |
| 4,306,952 | 12/1981 | Jansen | 204/149 |
| 4,548,695 | 6/1985 | Bridger et al. | 204/149 |
| 4,790,918 | 8/1988 | Bridger et al. | 204/149 |

FOREIGN PATENT DOCUMENTS

| 1247732 | 9/1971 | United Kingdom . |
| 2150597A | 7/1985 | United Kingdom . |
| 2187761A | 9/1987 | United Kingdom . |

Primary Examiner—John Niebling
Assistant Examiner—Arun S. Phasge
Attorney, Agent, or Firm—Larson and Taylor

[57] ABSTRACT

An apparatus for treating a liquid by electrochemical ion exchange comprises a flow channel (34) in which are arranged a cation-responsive ion exchange electrode (38) side by side with an anion-responsive ion exchange electrode (42), with a counter electrode (40,44) between them. By controlling the currents to the two ion exchange electrodes (38,42) independently, the pH of the treated liquid can be controlled at a desired value.

7 Claims, 1 Drawing Sheet

ELECTROCHEMICAL ION EXCHANGE

This invention relates to an apparatus and to a method for treating a liquid by electrochemical ion exchange.

The electrochemical removal of ions from aqueous solutions onto ion-exchange materials, sometimes referred to as electrochemical deionization, is known for example from UK patents GB 1 247 732 and GB 2 150 598. It involves establishing an electrochemical cell comprising the aqueous solution as electrolyte, a working electrode, and a counter electrode, where at least the working electrode incorporates an ion exchange material such as a resin, and applying a d.c. voltage between the electrodes. Subsequent reversal of the voltage enables the absorbed ions to be eluted, so the working electrode can be regenerated without addition of chemical components.

A working electrode may comprise a conducting component, for example platinised titanium mesh, coated with an intimate mixture of an ion exchange material and a binder such as an adhesive elastomer. A conducting material such as graphite may be included in the mixture. In the case of an electrode for removing cations from solution the ion exchange material typically incorporates weakly acidic groups, such as carboxylate, and this electrode would be made negative. Not only are cations therefore attracted by this electrode, but hydroxide ions are created by electrolysis near the conducting component which react with the weak acid groups to activate the ion exchange material (represented as XH). The cations M+ are therefore absorbed by the electrode:

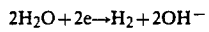

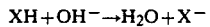

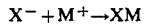

If the voltage is then reversed, hydrogen ions are generated near the conducting component, which displace the cations; the cations can therefore be eluted.

In an electrode for removing anions from solution the ion exchange material typically incorporates basic groups such as amines, and this electrode would be made positive. Anions are therefore attracted to it, and furthermore water is electrolysed near the conducting component to create hydrogen ions. This leads to activation of the ion-exchange material (represented as XN), and consequent absorption of the anions $A^-$:

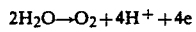

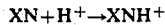

Subsequent reversal of the applied voltage leads to creation of hydroxide ions by electrolysis, with consequent elution of the anions:

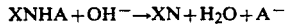

It will be appreciated that in general an electrochemical ion exchange cell might comprise a cation-responsive electrode with a counter electrode, or an anion-responsive electrode with a counter electrode, or a cation-responsive electrode with an anion-responsive electrode.

According to the present invention there is provided an apparatus for treating a liquid by electrochemical ion exchange, the apparatus comprising a chamber, means to enable the liquid to flow through the chamber, a cation-responsive electrode and an anion-responsive electrode within the chamber arranged such that at least part of the liquid flow will pass between them, at least one counter-electrode within the chamber, electrical supply means whereby electric currents may be supplied to each of the electrodes, and means to control independently the currents to the anion-responsive electrode and to the cation-responsive electrode so as to enable the pH of the liquid to be controlled.

The currents might be controlled so the pH of the treated liquid is the same as that of the liquid prior to treatment, or such that the pH rises or falls to a desired value during treatment. This can lead to greatly improved ion removal from an effluent stream.

Two or more such apparatuses may be used to treat a liquid stream on a continuous basis, as one apparatus can be regenerated by elution of absorbed ions while another is treating the liquid stream.

The invention also provides a method for treating a liquid by electrochemical ion exchange by passing the liquid through such an apparatus, and controlling the currents to the two working electrodes independently.

Figure 2:
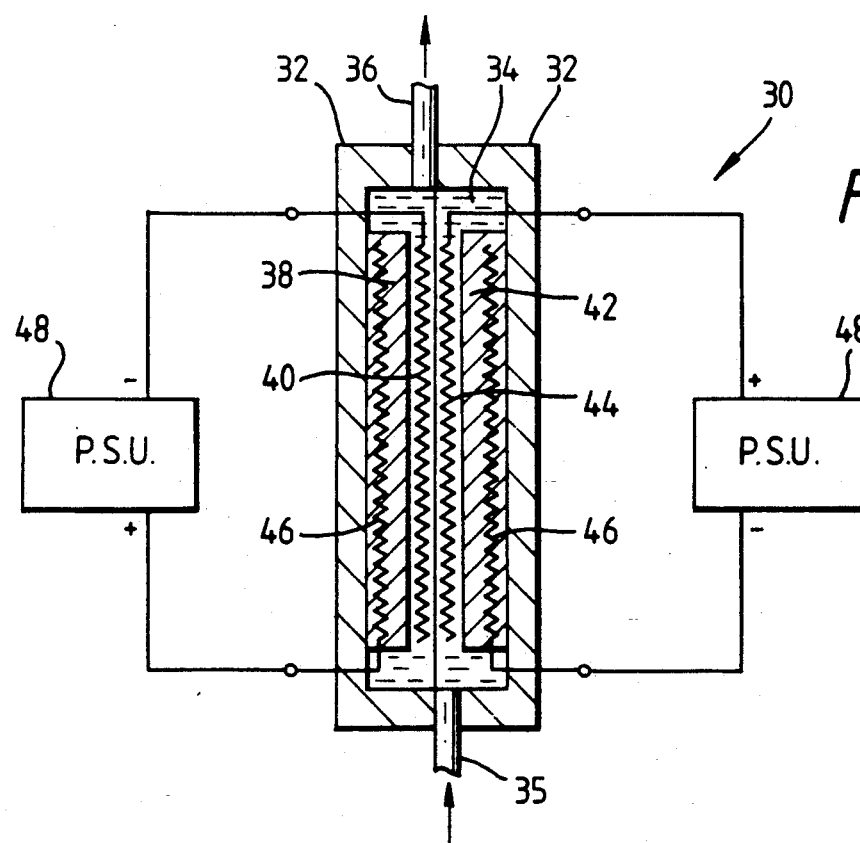

The invention will now be further described by way of example only and with reference to the accompanying drawings, in which:

FIG. 1 shows a diagrammatic flow chart of an electrochemical ion exchange liquid treatment plant; and FIG. 2 shows a sectional view of an electrochemical ion exchange apparatus of the invention, suitable for use in the plant of FIG. 1.

Referring to FIG. 1 there is shown a flow chart for a liquid treatment plant 10 which treats a continuous flow of liquid by electrochemical ion exchange. The plant 10 includes two identical electrochemical ion exchange modules 12, 13 each with its own electrical supply (not shown) and arranged for liquid flow in parallel; the feed of liquid to be treated is supplied via a diverter valve 14 to either one module 12 or the other 13, or to both. The liquid emerging from the modules 12, 13 may be diverted, either to an output duct 15 for treated liquid or to a waste duct 16 for concentrated effluent, by respective diverter/shut-off valves 18, 19. Between the inlet and outlet of each module 12, 13 is a respective recirculation duct 20 provided with an open/shut valve 22, 23 and recirculation pump 24, 25.

In operation of the plant 10, the liquid flow is treated by one module while the other module is regenerated; the flow can then be treated by the other module while the first one is regenerated. In FIG. 1, as indicated by the arrows, the valve 22 is closed and the valves 14 and 18 are such that the liquid to be treated flows through the module 12, whose power supply is arranged so that ions are extracted from the liquid. The module 13, initially full of liquid, is regenerated in three steps. Firstly, with the valve 19 shut, the valve 23 open, and the pump 25 on, the liquid is recirculated through the module 13 whose power supply is such that absorbed ions are eluted; the module 13 hence becomes full of a concentrated solution of the ions which had been absorbed. Secondly, with the valve 14 arranged to supply liquid to both modules 12, 13, with the valve 19 open and arranged to supply liquid to the waste duct 16, and with the valve 23 open and the pump 25 off, and the power supply off, concentrated solution is drained from the module 13 and from its recirculating duct 20, which are thereby filled with a fresh supply of the feed liquid. Thirdly, with the valve 19 closed, the valve 23 open and the pump 25 on, and with the power supply such that ions are absorbed, the fresh supply of feed liquid is circulated through the module 13 to ensure the ions are absorbed. The pump 25 can then be switched off and the valve 23 closed. The module 13 is thus regenerated, and can be used to treat the liquid while the other module 12 is being regenerated by the same three-step procedure.

The modules 12 and 13 may be of any different design of electrochemical ion exchange apparatus which is suitable for the liquid stream to be treated. It will also be appreciated that a plant might have more than two such modules. For example there might be three such modules, the liquid flow passing through two modules in series so the first module provides the main absorption stage and the second module provides a polishing stage to reduce the ion concentration still further, while the third module is regenerated. The three modules can then be cycled through these three stages in turn: the regenerated module becomes the new polishing module, the polishing module becomes the main absorbing module, and the main absorbing module is regenerated.

Referring to FIG. 2 there is shown an electrochemical ion exchange apparatus 30 suitable for use as one of the modules 12, 13 of the plant 10 of FIG. 1, FIG. 2 showing a sectional view, not to scale, in a vertical plane. The apparatus 30 comprises two perspex blocks 32 clamped together with opposed rectangular recesses which together define a rectangular flow channel 34 between an inlet duct 35 and an outlet duct 36. The channel 34 is about 340 mm tall, 10 mm wide (i.e. in the plane of the Figure), and 65 mm broad. The top and the bottom 20 mm of the channel 34 are substantially empty (except for liquid, in operation), but over the middle 300 mm substantially the entire breadth of the channel 32 is occupied by electrode assemblies: a cation-responsive working electrode 38 on whose surface is a platinised titanium mesh counter electrode 40, and an anion-responsive working electrode 42 on whose surface is another such counter electrode 44. Each working electrode 38 and 42 is about 3.5 mm thick, and the two counter electrodes 40 and 44 are only about 2 mm apart.

Each working electrode 38, 42 includes a platinised titanium mesh 46 embedded in an intimate mixture of binder and ion exchange material, the mesh 46 being closer to the rear surface of the mixture than to the front so that gas bubbles can escape from the mesh 46 without damaging the mixture. For electrode 38 the ion exchange material is zirconium phosphate ($Zr(HPO_4)_2$), while for electrode 42 the material is the strong base resin IRN 78L (Rohm and Haas). The working electrodes 38, 42 and the adjacent counter electrodes 40, 44 are connected to two 0-50 volt d.c. variable power supply units 48 so that electrode 38 is negative relative to the counter electrode 40 and so that electrode 42 is positive relative to the counter electrode 44. The electric currents flowing to or from the two working electrodes 38, 42 can hence be controlled independently.

It will be appreciated that whenever a current is passed between an electrochemical ion exchange electrode and a counter electrode a change in the pH of the liquid can be expected. For example during cation absorption using a cation-responsive electrode, the working electrode is a cathode and the counter-electrode an anode. At the counter-electrode water is electrolysed to generate oxygen gas and hydrogen ions, and consequently the pH of the liquid falls. Similarly during anion absorption the counter electrode will be a cathode, at which water is electrolysed to generate hydrogen gas and hydroxide ions, so that the pH rises and the liquid becomes more alkaline. These changes in pH would, on their own, tend to suppress the ion absorption process since, for example, cation absorption is inhibited by a more acidic solution.

In some situations a change in the pH of the liquid undergoing treatment is itself desirable. For example it is possible to remove, by precipitation, certain species from a solution by increasing the alkalinity of that solution. Metal ions (for example $Co^{2+}$) are precipitated as complex hydrous oxides which are frequently anionic in character. Therefore cobalt(II) ions can be removed from solution by effecting an increase in pH during absorption on an anion-responsive electrode. Using this technique it has proved possible to achieve decontamination factors of almost two hundred for removal of trace quantities of cobalt.

Volatile alkaline gases can also be displaced from solution by increasing the pH; thus ammonium ions can be removed from a stream by deprotonation of the ammonium to ammonia.

$$NH_4^+ + OH^- \rightarrow NH_3 + H_2O$$

In other circumstances making the solution more acidic, that is of lower pH, may be desirable. For example an increase in the acidity of a solution will tend to remove acid gases such as carbon dioxide. Therefore a swing in pH to approximately pH4 can be used to decarbonate a solution:

$$CO_3^{2-} + 2H^+ \rightarrow CO_2 + H_2O$$

prior to conventional anion electrochemical ion exchange treatment. This method is capable of removing relatively large quantities of the anion thus allowing the anion exchange system to act as a final polishing unit. An increase in the acidity of a feed solution may also change the nature of a target species. Protonation will always reduce the negative charge on an anion, e.g. borate.

$$H_2BO_3^- + H^+ \rightarrow H_3BO_3$$

The species is now uncharged and will pass through an anion-responsive module without being absorbed. Therefore a feed solution initially containing borate, sulphate and chloride can if acidified be passed through an anion-responsive module and since the chloride and sulphate remain unprotonated these ions alone will be absorbed. Cationic electrochemical ion exchange pretreatment will hence allow a degree of selectivity to be introduced, in that it allows the pH to be lowered to a desired degree.

The apparatus 30 of FIG. 2 enables the pH of a liquid stream to be controlled more easily than can be done using a single ion-responsive working electrode. By independently adjusting the currents supplied to the two working electrodes 38, 42 the pH can be adjusted to achieve any desired final pH within the range of about 4 to 11. The outputs of the two power supply units 48 may be adjusted automatically in response to signals from a meter measuring the pH of the liquid emerging from the outlet duct 36. This clearly could be achieved with the liquid flowing past an anion-responsive electrode and a cation-responsive electrode in turn, but in general it has been found that much better results can be obtained with the two working electrodes 38, 42 arranged side-by-side as shown, as the pH is effectively controlled throughout the whole length of the channel 34.

It will be appreciated that various changes might be made to the apparatus 30 of FIG. 2 while remaining within the scope of the present invention. For example the dimensions of the flow channel 34 and of the electrodes 38, 40, 42, might differ from that described above. The cation-responsive working electrode 38 might incorporate a different ion-exchange material, for example a resin such as Dowex 50, IE 96, CG 120 or IRC 84, and the anion-responsive working electrode 42 might instead incorporate a weaker base resin such as IRA 94S or IRA 60. Since no potential difference is needed between the two counter electrodes 40, 44 they might be electrically connected, or indeed one of them could be dispensed with, the other then acting as the counter electrode for both the working electrodes 38, 42.

We claim:

1. An apparatus for treating a liquid by electrochemical ion exchange, the apparatus comprising a chamber, means to enable the liquid to flow through the chamber, a cation-responsive electrode and an anion-responsive electrode within the chamber arranged such that at least part of the liquid flow will pass between them, at least one counter-electrode within the chamber, electrical supply means for supplying electric currents to each of the electrodes, and means to control independently the currents to the anion-responsive electrode and to the cation-responsive electrode so as to enable the pH of the liquid to be controlled.

2. An apparatus as claimed in claim 1 comprising a single counter-electrode between the two electrodes, to which the electrical supply means for the two electrodes are both connected.

3. A liquid treatment plant for treating a liquid by electrochemical ion exchange comprising at least two apparatuses as claimed in claim 1, combined with means for circulating the liquid to be treated through one apparatus and regenerating the other apparatus by eluting absorbed ions from it, and then circulating the liquid to be treated through the other apparatus and regenerating the one apparatus, alternately.

4. A method of treating a liquid by electrochemical ion exchange, by causing the liquid to flow through a chamber within which a cation-responsive electrode and an anion-responsive electrode are arranged such that at least part of the liquid flow passes between them, and within which is at least one counter-electrode, and controlling electric currents supplied to the anion-responsive electrode and to the cation-responsive electrode independently of each other.

5. A method as claimed in claim 4 wherein the currents are controlled so the pH of the treated liquid is the same as that of the liquid prior to treatment.

6. A method as claimed in claim 4 wherein the currents are controlled so the pH of the treated liquid is higher than that of the liquid prior to treatment so as to precipitate complex hydrous oxides of metal ions from the liquid, or so as to displace a volatile alkaline gas from the liquid.

7. A method as claimed in claim 4 wherein the currents are controlled so the pH of the treated liquid is lower than that of the liquid prior to treatment so as to displace a volatile acidic gas from the liquid, or so as bring about protonation of anions of a weak acid in the liquid.

* * * * *